Patented Feb. 27, 1940

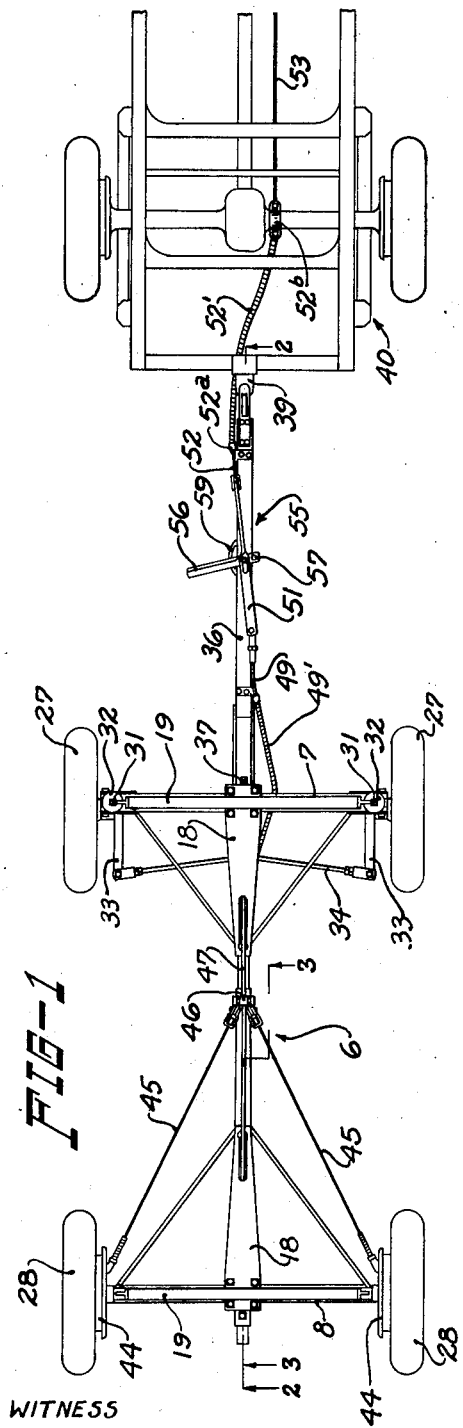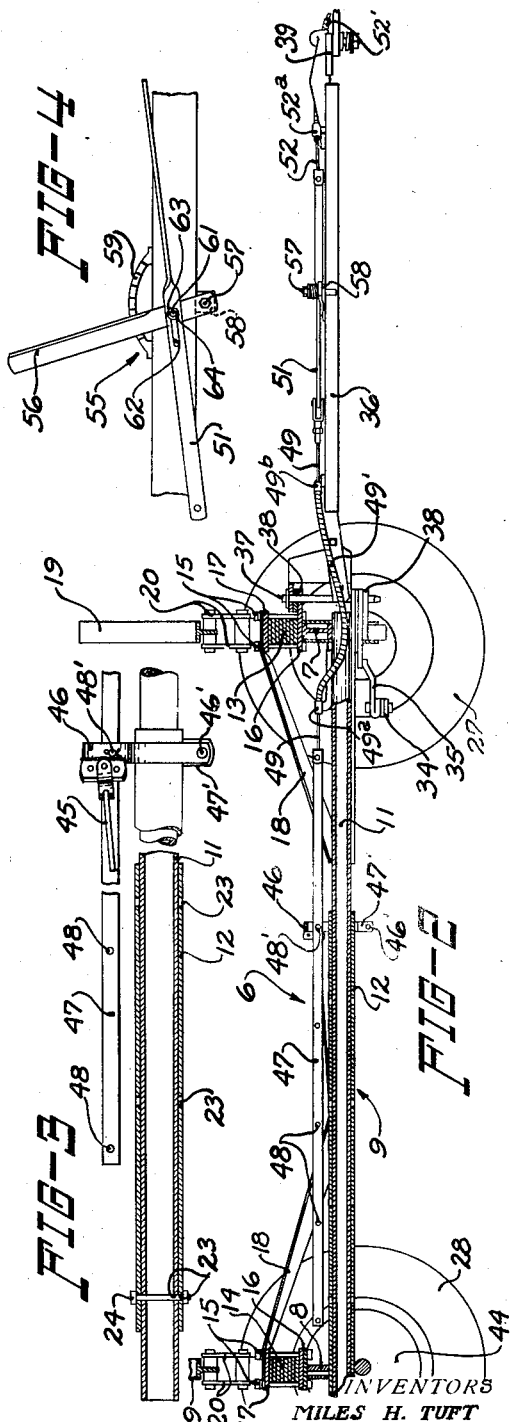

2,192,055

UNITED STATES PATENT OFFICE 2,192,055

TRAILER BRAKE

Miles H. Tuft and James H. Clark, Moline, Ill., assignors to Deere & Company, Moline, Ill., a corporation of Illinois Application April 21, 1938, Serial No. 203,338

9 Claims. (Cl. 188—3)

Our invention relates to trailers and similar structures adapted to be attached behind a towing vehicle, such as a truck or automobile, and pertains particularly to means for actuating the brakes of the trailer whereby the brakes may be applied or released either from the operator's station on the towing vehicle or from the trailer.

While operating a trailer structure of this general design when it is necessary to apply or release the brakes, this is done by actuating the lever provided for this purpose on the towing vehicle. Thus the operator may control the trailer, from the seat of the towing vehicle, and prevent its overrunning the towing vehicle when making a stop or when driving down an incline. When the trailer is disconnected from the towing vehicle, the brake actuating connection between the structures is also severed. If the trailer happens to be standing on an incline or sloping roadway when disconnected from the towing vehicle, it is necessary to block the wheels of the trailer or apply the brakes thereon to prevent it from moving down the grade. Blocking the wheels of the trailer is not entirely satisfactory or safe as the blocks sometimes become loosened by shock or vibration and allow the trailer to roll away from its parking place, endangering pedestrians and property. To overcome this difficulty the conventional design of trailer is provided with means positioned on the trailer body to apply the trailer brakes when the trailer is disconnected from the towing vehicle. Such an arrangement overcomes, to some extent, the difficulty experienced.

However, while this type of brake control is suitable for holding the vehicle stationary, it does not provide a control which can be used when maneuvering the trailer about by hand. It is therefore an object of this invention to provide a simple and efficient brake control means for trailers which is operable from the towing vehicle during operation and has conveniently disposed manually controlled means for use when the trailer is being maneuvered by hand.

The trailer employed in the present instance is of the type having an adjustable reach bar to permit the vehicle to be lengthened or shortened as desired. Heretofore, brakes have not been provided in vehicles of this type, because of certain complications experienced in adjusting the brake actuating rod to correspond with adjustments of the reach bar. A further object of our invention is to construct a brake actuating rod adapted to be mounted on the reach bar and which may be easily and quickly adjusted correspondingly with the longitudinal adjustment of the vehicle.

Other and further objects will appear from the following detailed description of an embodiment of our invention illustrated in the accompanying drawing, in which:

Figure 1 is a plan view of a trailer chassis shown attached to the rear end of a truck and illustrating the novel features of our brake actuating means;

Figure 2 is an enlarged longitudinal sectional view of the trailer taken substantially on the plane of line 2—2 of Figure 1;

Figure 3 is an enlarged detail sectional view taken on the plane of line 3—3 of Figure 1; and Figure 4 is an enlarged fragmentary plan view of the brake adjusting means mounted on the drawbar of the trailer.

The trailer referred to in its entirety by numeral 6, is preferably of the type disclosed in Patent No. 2,059,419, issued November 3, 1936, and comprises a front transverse axle 7 and a rear transverse axle 8 which are connected by a telescoping reach bar 9. The reach bar 9 includes a front tubular member 11 which is secured to the front axle 7 and extends rearwardly therefrom and projects into the forward end of a rear tubular member 12 which is attached to the rear axle 8. Transversely disposed leaf springs 13 and 14 of the semi-elliptic or automobile type are mounted on the axles 7 and 8, respectively, and are secured thereto by clamp bolts 15 which extend through plates 16 secured on the axles and through plates 17 provided above the springs. Brace members 18 are provided between the members 11 and 12 of the reach bar 9 and the springs 13 and 14, respectively, and serve to rigidly support the springs on the vehicle. A bolster 19 is mounted on each spring 13 and 14 and is supported on shackle members 20 which are pivotally connected to the bolsters and to the ends of the springs 13 and 14. The reach bar members 11 and 12 are provided with a plurality of holes 23 which may be brought into alignment at various positions of adjustment and are adapted to receive a retaining bolt 24 to securely lock the members in the desired position.

Front wheels 27 and rear wheels 28, preferably of the pneumatic tired type, are provided on the outer ends of the front and rear axles 7 and 8, respectively. The front wheels 27 are dirigible and are journaled on wheel spindles 31 which are supported in brackets 32 secured on the ends of the axle 7. A steering arm 33 is secured on each spindle 31 and extends rearwardly therefrom to a pivotal connection with a connecting rod 34. The connecting rod 34 is connected, intermediate its ends, to a rearwardly projecting arm 35 formed on the rear end of a tongue or draft member 36 which is pivotally mounted on a pivot bolt 37 supported in brackets 38 provided on the forward side of the front axle 7. The draft member 36 extends forwardly from the trailer 6 and is pivotally connected to an attaching bracket 39 which is secured to the rear end of a truck or similar towing vehicle 40.

The rear wheels 28 of the trailer 6 are provided with brakes 44 which are of the usual internal expanding type. The brakes 44 are actuated through brake rods 45 which extend inwardly and forwardly from the brakes 44 and are connected to a central lever 46 which is pivotally mounted on a pin 46' supported between a pair of laterally spaced lugs 47' welded to the reach member 12 and extending downwardly therefrom. A brake actuating bar 47 is connected to the lever 46 by a pin 48' disposed in a hole 48 in the bar 47, and the latter extends forwardly to a point adjacent the rear of the front axle 7. The bar 47 is provided with a plurality of holes 48 which are spaced apart the same distances as are the holes 23 in the reach bar 9 to accommodate adjustment of the bar 47 correspondingly with the adjustment of the reach bar 9. A flexible cable 49 is secured on the forward end of the bar 47 and extends below the axle 7 and forwardly, and is connected to a bar 51 disposed above the tongue 36. The cable 49 extends through a flexible but incompressible tubular member 49' which is supported rigidly at opposite ends thereof on the reach pole 11 and on the tongue 36 by means of fastening members 49a, 49b. The tubular member hangs loosely between the fixed points of support and permits movement of the tongue 36 relative to the trailer, while maintaining a constant length of cable 49 between said points whereby a pulling force on the end of the cable at the tongue will be transmitted to the rod 47 without straightening the cable 49, in a manner well known to those skilled in the art. The forward end of the bar 51 is connected, through a second flexible cable 52, encased in a second flexible incompressible tubular member 52' which extends between fixed points on the tongue 36 and the towing vehicle 40 and rigidly supported at opposite ends by fittings 52a, 52b, respectively, with a brake rod 53 provided on the towing vehicle, which rod extends forward to a hand lever (not shown) positioned adjacent the operator's station on the vehicle and by means of which the brakes 44 may be actuated from the towing vehicle when desired. The cables 49 and 52 provide a thoroughly flexible connection between the trailer and the towing vehicle so that the vehicles may be angled relative to each other when turning corners or driving over rolling or uneven ground. At the same time this arrangement provides a positive means for actuating the brake of the trailer from the towing vehicle.

To facilitate adjustment of the brakes 44, when the trailer 6 has been disconnected from the towing vehicle 40, an actuating device 55 is provided on the tongue 36. The device 55 is associated with the bar 51 and includes a hand lever 56 which is pivoted at 57 on a lug 58 projecting laterally from one side of the tongue 36. A stud 61 is secured on the lever 56 and extends upwardly through a slot 62 formed in the bar 51 and is retained therein by a washer 63 and cotter 64 (see Figure 4). The lever 56 is twisted slightly so that one edge thereof is adapted to engage a notched sector 59 which is secured on the opposite side of the tongue 36. To lock the brakes 44 when the trailer is disconnected from the towing vehicle, the lever 56 is swung forward about its pivot 57 and is secured in this forward position by engaging an adjacent notch in the sector 59.

By reason of the slot 62 in the bar 51, the brake actuating mechanism may be adjusted to lock the brakes 44 from the operator's station on the towing vehicle when the lever 56 is in normal released position as shown. Thus both vehicles may be operated as a unit by a single operator stationed on the towing vehicle. When the trailer has been disconnected from the towing vehicle, the brakes 44 may be locked, as previously described, by actuating the lever 56. An important advantage in having the actuating device 55 mounted on the tongue 36 is that when it is necessary to move the trailer by hand, the operator by propelling and guiding the vehicle by means of the tongue, has adequate control of the vehicle by virtue of the convenient position of the brake control lever. This arrangement provides the utmost convenience in operation and is also of simple design and economical to manufacture.

Although we have described a specific form of this invention in more or less detail, it will be apparent that various additions, omissions and substitutions can be made therein without departing from the spirit of this invention or the scope of the appended claims.

What we claim as new and desire to secure by Letters Patent is:

1. Brake operating mechanism for use on a trailer having a frame, supporting wheels disposed at the rear end of said frame, dirigible wheels disposed at the front end of the frame, brakes on certain of said wheels, a draft tongue flexibly attached to said frame and connected with said dirigible wheels for steering the same, and hitch means for flexibly connecting said draft tongue to a towing vehicle, said brake operating mechanism comprising, in combination, a bar disposed adjacent said draft tongue and movable relative thereto, a flexible cable connecting said bar with brake actuating means on the towing vehicle, said cable being disposed within a flexible, incompressible tube that is anchored at one end to said towing vehicle and at the other end to said draft tongue, means connecting said bar with said brakes, including a second flexible cable contained within a second flexible, incompressible tube, and means for fixedly securing the ends of said second tube to said draft tongue and trailer frame, respectively, a lever pivotally connected with said draft tongue, and lost motion means connecting said lever with said bar whereby said brakes may be operated either from said towing vehicle or from a position adjacent the draft tongue.

2. Brake operating mechanism for use on a trailer having a frame, supporting wheels disposed at the rear end of said frame, dirigible wheels disposed at the front end of the frame, brakes on certain of said wheels, a draft tongue flexibly attached to said frame and connected with said dirigible wheels for steering the same, and hitch means for flexibly connecting said draft tongue to a towing vehicle, said brake operating mechanism comprising, in combination, a bar disposed adjacent said draft tongue and movable relative thereto, flexible motion transmitting means connecting said bar at one end with brake actuating means on the towing vehicle, means operatively connecting the other end of said bar with said brakes including a second flexible motion transmitting means disposed between said draft tongue and said trailer frame, control means movably connected with said draft tongue, and means connecting said control means with said bar whereby said brakes may be operated either from said towing vehicle or from a position adjacent the draft tongue, at option.

3. Brake operating mechanism for use with a trailer having a wheel supported frame, brakes on some of the wheels, and a draft member pivotally attached to said frame and adapted to be pivotally connected to a towing vehicle, said brake operating mechanism comprising, in combination, control means positioned on said towing vehicle, flexible motion transmitting means connecting said control means and said brakes, a control member supported on said draft member, and lost motion means connecting said control member with said flexible means, to permit said brakes to be actuated either from said vehicle or from a position adjacent said draft member.

4. Brake operating mechanism for use on a trailer having a wheel supported frame, brakes on certain of the supporting wheels, and a draft member pivotally connected to said frame and to said towing vehicle, said mechanism comprising, in combination, a brake rod on said trailer frame, a bar on said draft member, flexible means connecting the ends of said bar with said brake rod and with brake actuating mechanism on said towing vehicle, and means on said draft member engaging said bar for actuating said brakes from a position adjacent the draft member.

5. Brake operating mechanism for use with a wheel supported trailer having brakes on the supporting wheels, a draft member pivotally connected to said trailer, and hitch means for flexibly attaching said draft member to a towing vehicle, said mechanism comprising, in combination, a brake rod on said trailer, a bar on said draft member, flexible means connecting one end of said bar with brake actuating mechanism on the towing vehicle, said flexible means extending through a flexible incompressible tube fixed to said towing vehicle and to said draft member, second flexible means connecting the other end of said bar with the brake rod on said trailer, said second flexible means being encased in a second flexible incompressible tube secured to said trailer and to said draft member, and means on said draft member for actuating said bar independently of the brake actuating mechanism on said towing vehicle.

6. Brake operating mechanism for use on a trailer having a frame, supporting wheels disposed at the rear end of said frame, dirigible wheels disposed at the front end of the frame, brakes on certain of said wheels, a draft tongue flexibly attached to said frame and connected with said dirigible wheels for steering the same, and hitch means for flexibly connecting said draft tongue to a towing vehicle, said brake operating mechanism comprising, in combination, a bar disposed adjacent said draft tongue and movable relative thereto, flexible motion transmitting means connecting said bar at one end with brake actuating means on the towing vehicle, means operatively connecting the other end of said bar with said brakes including a second flexible motion transmitting means disposed between said draft tongue and said trailer frame, control means movably connected with said draft tongue, lost motion means connecting said control means with said bar whereby said brakes may be operated by either said control means or by the brake actuating means on said towing vehicle, independently of one another, and detent means for holding said control means in braking position.

7. Brake operating mechanism for use on a trailer having a frame supported on front dirigible wheels and rear supporting wheels, a draft tongue swingably connected to said frame and operatively connected with said dirigible wheels to steer the same, hitch means for attaching said draft tongue to a towing vehicle, and brakes on certain of said wheels, said brake operating mechanism comprising, in combination, a bar connected to said draft tongue for movement relative thereto, flexible connections between said bar and said brakes, operating connections between said bar and brake actuating means on said towing vehicle, and a control member movably connected with said draft tongue and engageable with said bar for operating said brakes from a position adjacent the draft tongue.

8. Mechanical brake operating mechanism for use on a trailer having a wheel supported frame, a forwardly extending draft tongue connected to said frame, hitch means for flexibly connecting the front end of said draft tongue to a towing vehicle, and mechanical brakes on certain of said supporting wheels, said brake operating mechanism comprising, in combination, a bar disposed substantially parallel to said draft tongue and connected thereto for relative fore and aft movement, means connecting one end of said bar with said brakes whereby the brakes are operated when the bar is moved relative to the draft tongue, flexible motion transmitting means connecting the other end of said bar with brake actuating mechanism on the towing vehicle, a brake control lever pivotally mounted on said draft tongue, lost motion means connecting said control lever with said bar whereby said brakes may be actuated from a position adjacent the draft tongue independently of the brake actuating mechanism on said towing vehicle, and detent means for holding said control lever in any predetermined position.

9. Brake operating mechanism for use on a trailer having a frame, supporting wheels disposed at the rear end of said frame, dirigible wheels disposed at the front end of the frame, brakes on certain of said wheels, a draft tongue flexibly attached to said frame and connected with said dirigible wheels for steering the same, and hitch means for flexibly connecting said draft tongue to a towing vehicle, said brake operating mechanism comprising, in combination, a bar disposed adjacent said draft tongue and movable relative thereto, said bar having a longitudinally extending slot formed therein, a flexible cable connecting said bar with brake actuating mechanism on said towing vehicle, a flexible, incompressible tube enclosing said cable and having one end thereof anchored to said towing vehicle and the other end thereof fixedly secured to said draft tongue, flexible motion transmitting means connecting said bar with said brakes, a control lever pivotally connected to said draft tongue and having a stud slidably engaged in said slot, and detent means for holding said control lever in any predetermined position.

JAMES H. CLARK.
MILES H. TUFT.